US012759398B2

(12) United States Patent
Ryu

(10) Patent No.: US 12,759,398 B2
(45) Date of Patent: Oct. 13, 2026

(54) INSTRUMENT CLUSTER APPARATUS AND DRIVER POSTURE WARNING ARRANGEMENT

(71) Applicant: Continental Automotive Technologies GmbH, Hannover (DE)

(72) Inventor: Jusung Ryu, Sejong-si (KR)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 42 days.

(21) Appl. No.: 19/105,555

(22) PCT Filed: Jul. 5, 2023

(86) PCT No.: PCT/EP2023/068482
§ 371 (c)(1),
(2) Date: Feb. 21, 2025

(87) PCT Pub. No.: WO2024/041789
PCT Pub. Date: Feb. 29, 2024

(65) Prior Publication Data

US 2026/0054572 A1 Feb. 26, 2026

(30) Foreign Application Priority Data

Aug. 25, 2022 (GB) ...................................... 2212341

(51) Int. Cl.
*B60Q 1/00* (2006.01)
*B60K 35/28* (2024.01)
(Continued)

(52) U.S. Cl.
CPC ............ *B60K 35/28* (2024.01); *B60N 2/0027* (2023.08); *B60N 2/003* (2023.08); *B60N 2/90* (2018.02);
(Continued)

(58) Field of Classification Search
CPC .............. B60K 35/28; B60K 2360/167; B60K 2360/168; B60K 2360/178; B60K 35/10;
(Continued)

(56) References Cited

U.S. PATENT DOCUMENTS

2015/0015399 A1 1/2015 Gleckler et al.
2015/0366350 A1 12/2015 Di Censo et al.
(Continued)

FOREIGN PATENT DOCUMENTS

EP 2957193 A1 12/2015
JP 61113527 5/1986
(Continued)

OTHER PUBLICATIONS

Search Report dated Feb. 23, 2023 from corresponding GB patent application No. 2212341.8.
(Continued)

*Primary Examiner* — Anh V La
(74) *Attorney, Agent, or Firm* — Buchanan Ingersoll & Rooney PC

(57) ABSTRACT

An instrument cluster apparatus for a vehicle including a display is disclosed. A pressure sensing input interface is connectable to a plurality of pressure sensors distributed in a seat, a backrest, and a headrest of a driver seat to receive a plurality of pressure readings sensed by the plurality of pressure sensors, and a processor is connected to the display and the pressure sensing input interface, the processor being configured to control at least one portion of the display to switch from displaying one or more vehicle parameters to displaying a driver posture warning based on the plurality of pressure readings meeting one of a plurality of preset conditions over a corresponding predetermined time period. A driver posture warning arrangement including the instru-
(Continued)

ment cluster apparatus and the driver seat having the plurality of pressure sensors is also disclosed.

15 Claims, 5 Drawing Sheets

(51) Int. Cl.

| | |
|---|---|
| ***B60N 2/00*** | (2006.01) |
| ***B60N 2/90*** | (2018.01) |
| ***B60W 40/08*** | (2012.01) |
| ***B60W 50/14*** | (2020.01) |

(52) U.S. Cl.

CPC ............ *B60W 40/08* (2013.01); *B60W 50/14* (2013.01); *B60K 2360/167* (2024.01); *B60K 2360/168* (2024.01); *B60K 2360/178* (2024.01); *B60N 2002/981* (2018.02); *B60W 2040/0881* (2013.01); *B60W 2050/146* (2013.01); *B60W 2540/223* (2020.02)

(58) Field of Classification Search

CPC .......... B60K 35/213; B60K 2360/1523; B60K 2360/48; B60K 35/22; B60K 35/60; B60K 35/00; B60K 37/00; B60N 2/0027; B60N 2/003; B60N 2/90; B60N 2002/981; B60W 40/08; B60W 50/14; B60W 2040/0881; B60W 2050/146; B60W 2540/223; B60Y 2400/306

USPC .......... 340/439, 438, 425.5, 576, 575, 573.1

See application file for complete search history.

(56) References Cited

U.S. PATENT DOCUMENTS

| | | | | |
|---|---|---|---|---|
| 2017/0197523 | A1 | 7/2017 | Magana et al. | |
| 2018/0251031 | A1* | 9/2018 | Liebau | B60K 35/10 |
| 2018/0304774 | A1 | 10/2018 | Mizoi | |
| 2019/0232786 | A1 | 8/2019 | Sasaki et al. | |
| 2020/0383622 | A1* | 12/2020 | Ali | A61B 5/721 |
| 2021/0197747 | A1* | 7/2021 | Yoshizawa | B60H 1/00978 |
| 2022/0111765 | A1* | 4/2022 | Kaku | A47C 1/00 |

FOREIGN PATENT DOCUMENTS

| | | | |
|---|---|---|---|
| JP | 2019135135 | A | 8/2019 |
| JP | 2020083214 | A | 6/2020 |
| JP | 2021105981 | A | 7/2021 |
| JP | 2022123925 | A | 8/2022 |
| JP | 2022145879 | A | 10/2022 |
| KR | 970061440 | A | 9/1997 |
| KR | 102054900 | B1 | 12/2019 |
| KR | 20200036091 | A | 4/2020 |
| KR | 102343358 | B1 | 12/2021 |

OTHER PUBLICATIONS

International Search Report and Written Opinion dated Oct. 2, 2023 from corresponding International patent application No. PCT/EP2023/068482.

* cited by examiner

INSTRUMENT CLUSTER APPARATUS AND DRIVER POSTURE WARNING ARRANGEMENT

CROSS REFERENCE TO RELATED APPLICATIONS

This US patent application claims the benefit of PCT patent application No. PCT/EP2023/068482, filed Jul. 5, 2023, which claims the benefit of United Kingdom patent application No. 2212341.8, filed Aug. 25, 2022, both of which are hereby incorporated by reference.

TECHNICAL FIELD

The present disclosure relates to an instrument cluster apparatus. The present disclosure further relates to a driver posture warning arrangement including the instrument cluster apparatus.

BACKGROUND

During driving, a driver may slouch into a suboptimal posture when the driver is tired or bored, especially during long drive or when the traffic situation is dull. However, the driver may become less attentive when the driver is lazed in the suboptimal posture. Hence, the driver may become slower to react to any sudden event, or be caught off-guard, or even doze off potentially resulting in accident. Further, while the driver may temporary feel relax in the suboptimal posture, prolong period of driving in the suboptimal posture may induce discomfort and/or pain, for example, in the back, shoulder, neck, arms, and/or waist due to undue strain.

Thus, there exists a need to keep the driver from drifting into the suboptimal posture during driving.

SUMMARY

The invention is set out in the appended set of claims.

BRIEF DESCRIPTION OF THE DRAWINGS

In the following description, various embodiments are described with reference to the following drawings, in which.

In the drawings, like reference characters generally refer to the same parts throughout the different views. The drawings are not necessarily to scale, emphasis instead generally being placed upon illustrating the principles of the disclosure.

DETAILED DESCRIPTION

Figure 1:
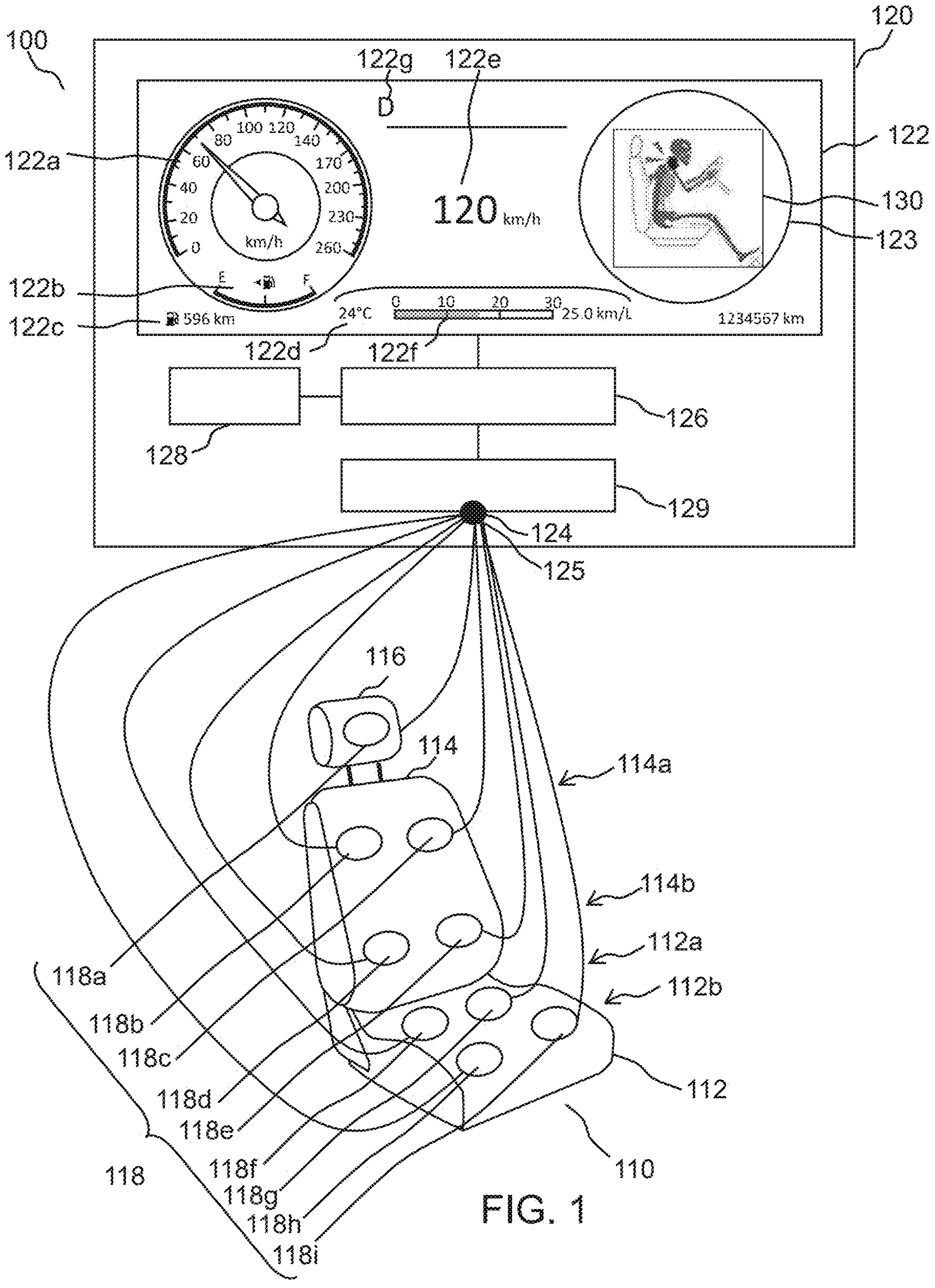
FIG. 1 shows a driver posture warning arrangement for a vehicle according to various embodiments.

Embodiments described below in context of the apparatus are analogously valid for the respective methods, and vice versa. Furthermore, it will be understood that the embodiments described below may be combined, for example, a part of one embodiment may be combined with a part of another embodiment.

It should be understood that the terms “on”, “over”, “top”, “bottom”, “down”, “side”, “back”, “left”, “right”, “front”, “lateral”, “side”, “up”, “down” etc., when used in the following description are used for convenience and to aid understanding of relative positions or directions, and not intended to limit the orientation of any device, or structure or any part of any device or structure. In addition, the singular terms “a”, “an”, and “the” include plural references unless context clearly indicates otherwise. Similarly, the word “or” is intended to include “and” unless the context clearly indicates otherwise.

Various embodiments generally relate to an instrument cluster apparatus for a vehicle. The instrument cluster apparatus may communicate and/or display vehicle parameters or information to a driver of the vehicle. The vehicle parameters or information may include, but not limited to, vehicle speed, mileage, rotation speed, oil pressure, fuel level, engine temperature, or battery voltage. Accordingly, the instrument cluster apparatus may include or may display a speedometer, an odometer, a tachometer, an oil pressure gauge, a fuel level gauge, an engine temperature gauge, or a battery voltage indicator. Further, the instrument cluster apparatus may be connected (e.g. electrically connected), either directly or via a vehicle communication network (e.g. Controller Area Network, Ethernet, etc), to one or more system(s), module(s), and/or sensor(s), etc. of the vehicle for receiving the vehicle parameters or information from such system(s), module(s), and/or sensor(s), etc. of the vehicle. The received vehicle parameters or information may then be communicated and/or displayed by the instrument cluster apparatus to the driver of the vehicle, for example through a display of the instrument cluster apparatus. According to various embodiments, the instrument cluster apparatus may be an electronic instrument cluster apparatus, a digital instrument panel, or a digital dash, etc. Further, the instrument cluster may usually be disposed at a front of the vehicle cabin of the vehicle so as to be in front of the driver of the vehicle.

Various embodiments seek to provide an instrument cluster apparatus that may communicate and/or display warning to the driver when the driver is sitting in a suboptimal posture. According to various embodiments, a driver seat may be provided with a plurality of sensors (e.g. pressure sensors) to detect a sitting posture of the driver. Accordingly, the instrument cluster apparatus may be connected to the plurality of sensors distributed in the driver seat to receive sensors readings (e.g. pressure readings) from the plurality of sensors. Based on the sensors readings, the instrument cluster apparatus may determine whether the sitting posture of the driver is suboptimal. If it is determined that the sitting posture of the driver is suboptimal, the instrument cluster apparatus may communicate and/or display a warning, such as a visual driver posture warning, to alert the driver to correct the sitting posture.

According to various embodiments, upon detecting that the sitting posture of the driver is suboptimal, the instrument cluster apparatus may display the visual driver posture warning on a portion of a display of the instrument cluster apparatus. According to various embodiments, the portion of the display of the instrument cluster apparatus may be originally displaying one or more vehicle parameters or information and may be switched to display the visual driver posture warning when the sensors readings indicate that the sitting posture of the driver is suboptimal. According to various embodiments, the portion of the display of the instrument cluster apparatus may switch back to displaying the one or more vehicle parameters or information after a predetermined duration of displaying the visual driver posture warning. According to various embodiments, the portion of the display of the instrument cluster apparatus may also switch back to displaying the one or more vehicle parameters or information when the sensors readings no longer indicate that the sitting posture of the driver is suboptimal.

According to various embodiments, the sitting posture of the driver may be determined to be suboptimal when the sensor readings meet one of a plurality of preset conditions. Each of the plurality of preset conditions may correspond to a single suboptimal sitting posture. Accordingly, with the plurality of preset conditions, the instrument cluster apparatus may be capable of displaying the visual driver posture warning for a range of suboptimal sitting postures. Hence, when the sitting posture of the driver is one of the suboptimal sitting postures within the range of suboptimal sitting postures, the plurality of sensors distributed in the driver seat may provide the sensor readings that meet the preset condition corresponding to said suboptimal sitting posture to cause the instrument cluster apparatus to display the visual driver posture warning.

According to various embodiments, the instrument cluster apparatus may display a different warning content serving as the visual driver posture warning for each suboptimal sitting posture within the range of suboptimal sitting postures. Accordingly, the visual driver posture warning may be selected from a plurality of warning contents, each warning content being associated with a corresponding suboptimal sitting posture whereby said warning content may be selected and displayed as the visual driver posture warning when the sensor readings met the corresponding preset condition. The different warning contents may provide information on what is wrong with the sitting posture of the driver so that the driver may know what needs to be corrected. The different warning contents may be in graphic form or textual form or a combination.

Various embodiments may also seek to provide a driver posture warning arrangement (or system). The driver posture warning arrangement may include the instrument cluster apparatus according to the various embodiments, and the driver seat having the plurality of sensors. Accordingly, the sitting posture of the driver may be sensed by the plurality of sensors of the driver seat, which provides the sensor readings to the instrument cluster apparatus for determining whether the sitting posture of the driver is suboptimal and to display the visual driver posture warning on the instrument cluster apparatus if it is determined that the sitting posture of the driver is suboptimal. Hence, in the driver posture warning arrangement, the driver seat with the plurality of sensors and the instrument cluster apparatus may operate cooperatively for sensing the sitting posture of the driver and alerting the driver when the sitting posture is suboptimal.

FIG. 1 shows a driver posture warning arrangement 100 (or a driver posture warning system) for a vehicle according to various embodiments. According to various embodiments, the driver posture warning arrangement 100 may include a driver seat 110 and an instrument cluster apparatus 120. The driver seat 110 may be disposed in a vehicle cabin of the vehicle and co-located with a steering wheel of the vehicle such that a driver sitting in the driver seat 110 may control and steer the vehicle. The instrument cluster apparatus 120 may be disposed at a front of the vehicle cabin of the vehicle in a manner so as to be facing the driver seat 110. Accordingly, when the driver sits in the driver seat 110, the driver may look directly at the instrument cluster apparatus 120. Further, the instrument cluster apparatus 120 may be behind the steering wheel when viewed from the driver sitting on the driver seat 110.

According to various embodiments, the driver seat 110 may include a seat 112, a backrest 114 and a headrest 116. The seat 112 may be a part of the driver seat 110 that supports a driver in a sitting position, or on which the driver sits. The backrest 114 may be a part of the driver seat 110 extending upright from the seat 112 to serve as a support on which the driver's back may rest. The headrest 116 may be a part of the driver seat 110 attached to a top of the backrest 114 on which the driver's head may rest.

According to various embodiments, the driver seat 110 may include a plurality of sensors 118. According to various embodiments, the plurality of sensors 118 may be a plurality of pressure sensors 118*a* to 118*i*. Each of the plurality of pressure sensors 118*a* to 118*i* may include a pressure-sensitive element for measuring the pressure applied thereon and convert the measurement into an output signal or reading as a measure of the pressure being sensed. Hence, each of the plurality of pressure sensors 118*a* to 118*i* may provide an output to serve as a pressure reading.

According to various embodiments, the plurality of pressure sensors 118*a* to 118*i* may be distributed in the seat 112, the backrest 114, and the headrest 116 of the driver seat 110. Accordingly, with the plurality of pressure sensors 118*a* to 118*i* distributed over the various parts of the driver seat 110, the plurality of pressure sensors 118*a* to 118*i* may sense the pressure across different points over the various parts of the driver seat 110 applied by the driver sitting in the driver seat 110 and provide a plurality of pressure readings representative of the sitting posture of the driver at that point in time. Hence, the plurality of pressure readings from the plurality of pressure sensors 118*a* to 118*i* may serve as a measure or a representation of the sitting posture of the driver.

As a non-limiting example, the plurality of pressure sensors 118*a* to 118*i* may be distributed in the manner as shown in FIG. 1. Accordingly to various embodiments, the driver seat 110 may include a first pressure sensor 118*a* disposed in the headrest 116, a second pressure sensor 118*b* and a third pressure sensor 118*c* disposed side by side in a upper region 114*a* of the backrest 114, a fourth pressure sensor 118*d* and a fifth pressure sensor 118*e* disposed side by side in a lower region 114*b* of the backrest 114, a sixth pressure sensor 118*f* and a seventh pressure sensor 118*g* disposed side by side in an aft region 112*a* of the seat 112, and an eighth pressure sensor 118*h* and a ninth pressure sensor 118*i* disposed side by side in a forward region 112*b* of the seat 112. It is understood that the configuration, distribution and/or disposition of the plurality of pressure sensors 118*a* to 118*i* as shown in FIG. 1 is provided as an illustration only and may not be exhaustive to all possible configurations, distribution and/or disposition of the plurality of pressure sensors 118*a* to 118*i* suitable for performing the functions as discussed herein.

According to various embodiments, each of the plurality of pressure sensors 118*a* to 118*i* may include a film-type pressure sensor. The film-type pressure sensor may have a film or foil structure. Each of the plurality of pressure sensors 118*a* to 118*i* may also be flexible. According to various embodiments, each of the plurality of pressure sensors 118*a* to 118*i* may be inserted into a corresponding part of the driver seat 110 in a manner such that the driver sitting on the driver seat 110 may not feel the plurality of pressure sensors 118*a* to 118*i* while the plurality of pressure sensors 118*a* to 118*i* may still sense the pressure applied by the driver when seated. For example, each of the plurality of pressure sensors 118*a* to 118*i* may be inserted into a cushion of a corresponding part of the driver seat 110, for example a surface cushion layer of the respective cushion.

According to various embodiments, the instrument cluster apparatus 120 may be configured to communicate and/or display the vehicle parameters or information to the driver of the vehicle. For example, the instrument cluster apparatus 120 may include or may display, but not limited to, a speedometer, an odometer, a tachometer, an oil pressure gauge, a fuel level gauge, an engine temperature gauge, or a battery voltage indicator for communicating and/or displaying vehicle parameters or information such as vehicle speed, mileage, rotation speed, oil pressure, fuel level, engine temperature, or battery voltage respectively. According to various embodiments, the instrument cluster apparatus 120 may be connectable or connected (e.g. electrically connected), either directly or via a vehicle communication network (e.g. Controller Area Network, Ethernet, etc), to one or more system(s), module(s), and/or sensor(s), etc. of the vehicle for receiving the vehicle parameters or information from such system(s), module(s), and/or sensor(s), etc. of the vehicle. Hence, the instrument cluster apparatus 120 may serve as a user interface for communication and/or displaying received vehicle parameters or information to the driver of the vehicle (e.g. through visual means or audio means). According to various embodiments, the instrument cluster apparatus 120 may be an electronic instrument cluster apparatus, a digital instrument panel, or a digital dash, etc.

According to various embodiments, the instrument cluster apparatus 120 may include a display 122. The display 122 of the instrument cluster apparatus 120 may serve as the visual means for communicating and/or displaying received vehicle parameters or information to the driver of the vehicle. According to various embodiments, the instrument cluster apparatus 120 may include a pressure sensing input interface 124. The pressure sensing input interface 124 may be configured to receive a plurality of pressure readings output from the plurality of pressure sensors 118*a* to 118*i*, whereby the plurality of pressure readings may be raw data to be processed for converting into a warning to be communicated or displayed by the instrument cluster apparatus 120, for example via the display 122. Accordingly, in addition to communicating and/or displaying vehicle parameters or information, the instrument cluster apparatus 120 may be configured to also communicate and/or display the warning to the driver of the vehicle. According to various embodiments, the instrument cluster apparatus 120 may include a processor 126. According to various embodiments, the processor 126 of the instrument cluster apparatus 120 may be connected to the display 122 of the instrument cluster apparatus 120 and the pressure sensing input interface 124 of the instrument cluster apparatus 120. Accordingly, the processor 126 of the instrument cluster apparatus 120 may control the display 122 to communicate and/or display the vehicle parameters or information, as well as relevant warnings, to the driver of the vehicle. Further, the processor 126 of the instrument cluster apparatus 120 may receive inputs (e.g. the plurality of pressure readings sensed by the plurality of pressure sensors 118*a* to 118*i* of the driver seat 110) via the pressure sensing input interface 124 for processing into the warning to be communicated or displayed by the instrument cluster apparatus 120.

According to various embodiments, the term "processor" encompasses all kinds of apparatus, devices, and machines for processing data, including by way of example a programmable processor, a computer, a system on a chip (i.e. SoC), or multiple ones, or combinations, of the foregoing. The "processor" may include special purpose logic circuitry, e.g., an FPGA (field programmable gate array) or an ASIC (application specific integrated circuit). The "processor" may also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

According to various embodiments, some of the processes and logic flows described in this specification may be performed by one or more processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

According to various embodiments, a computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program, or in multiple coordinated files (e.g., files that store one or more modules, sub programs, or portions of code). A computer program may be deployed to be executed on one computer or on multiple computers that are located at one site or distributed across multiple sites and interconnected by a communication network According to various embodiments, the pressure sensing input interface 124 of the instrument cluster apparatus 120 may be connectable or connected (e.g. electrically connected) to the plurality of pressure sensors 118*a* to 118*i* distributed in the seat 112, the backrest 114, and the headrest 116 of the driver seat 110. Further, the pressure sensing input interface 124 of the instrument cluster apparatus 120 may be configured to receive the plurality of pressure readings sensed by the plurality of pressure sensors 118*a* to 118*i*. According to various embodiments, the pressure sensing input interface 124 of the instrument cluster apparatus 120 may serve as a connection or a connecting point between the processor 126 of the instrument cluster apparatus 120 and the plurality of pressure sensors 118*a* to 118*i* of the driver seat 110. Accordingly, the instrument cluster apparatus 120 may receive the plurality of pressure readings sensed by the plurality of pressure sensors 118*a* to 118*i* of the driver seat 110 through the pressure sensing input interface 124.

According to various embodiments, the pressure sensing input interface 124 of the instrument cluster apparatus 120 may include a plurality of pressure sensing input terminals 125 respectively connectable or connected to the plurality of pressure sensors 118*a* to 118*i* to respectively receive the plurality of pressure readings of the plurality or pressure sensors 118*a* to 118*i*. Each of the plurality of pressure sensing input terminals may be a signal line for connecting to a corresponding pressure sensors to enable transfer of information, data, signal, etc.

According to various embodiments, the instrument cluster apparatus 120 may include a communication bus 129. The communication bus 129 may be connectable or connected to the vehicle communication network (e.g. Controller Area Network, Ethernet, etc), and/or directly to one or more system(s), module(s), and/or sensor(s), etc. According to various embodiments, the communication bus 129 may include the pressure sensing input interface 124 for connecting to the plurality of pressure sensors 118*a* to 118*i*. Further, the communication bus 129 may include other interface and/or terminals for connecting to other system(s), module (s), and/or sensor(s), etc.

According to various embodiments, the display 122 may be an analogue display or an electronic/digital display or a combination. According to various embodiments, the display 122 may include one or a combination of a speedometer face, an odometer readout, a tachometer face, an oil pressure gauge face, a fuel level gauge face, a fuel level indicator/readout, an engine temperature readout, a battery voltage indicator/readout, a speed readout, a gear position indicator, a fuel consumption indicator/readout, etc. For example, as shown in FIG. 1, the display 122 may include a speedometer face 122*a*, a fuel level gauge face 122*b*, a fuel level indicator/readout 122*c*, an engine temperature readout 122*d*, a speed readout 122*e*, a fuel consumption indicator/readout 122*f*, and a gear position indicator 122*g*. According to various embodiments, at least one portion 123 of the display 122 may be an electronic/digital display. The electronic/digital display may include, but not limited to, a liquid crystal display (LCD), a thin-film transistor display (TFT), a light-emitting diode display (LED), a quantum dot display (QLED), an organic light-emitting diode display (OLED), an active-matrix organic light-emitting diode display (AMOLED), or a plasma display panel (PDP). According to various embodiments, the entire display 122 of the instrument cluster apparatus 120 may be an electronic/digital display.

According to various embodiments, the processor 126 of the instrument cluster apparatus 120 may be configured to control the at least one portion 123 of the display 122 to display a driver posture warning 130 based on the plurality of pressure readings meeting one of a plurality of preset conditions. Accordingly, when the plurality of pressure readings received by the processor 126 of the instrument cluster apparatus 120 through the pressure sensing input interface 124 of the instrument cluster apparatus 120 from the plurality of pressure sensors 118*a* to 118*i* of the driver seat 110 meets one of the plurality of preset conditions, the sitting posture of the driver is determined to be suboptimal. Hence, the processor 126 of the instrument cluster apparatus 120 may determine whether the sitting posture of the driver is suboptimal by checking, comparing, analyzing or evaluating the plurality of pressure readings received against the plurality of preset conditions. When the processor 126 of the instrument cluster apparatus 120 determines that the sitting posture of the driver is suboptimal, the processor 126 of the instrument cluster apparatus 120 may then control the at least one portion 123 of the display 122 to display a driver posture warning 130 to alert the driver.

According to various embodiments, each of the plurality of preset conditions may be a predetermined state of the plurality of pressure readings representing a corresponding suboptimal sitting posture of the driver. Hence, each of the plurality of preset conditions may correspond to a single suboptimal sitting posture of the driver. Accordingly, by checking, comparing, analyzing or evaluating the plurality or pressure readings against the plurality of preset conditions, the processor 126 of the instrument cluster apparatus 120 may check, compare, analyze or evaluate the plurality of pressure readings against a range of suboptimal sitting postures. Hence, when the processor 126 of the instrument cluster apparatus 120 determines the plurality of pressure readings meets the one of the plurality of preset conditions, the sitting posture of the driver may be inferred to be in a corresponding suboptimal sitting posture and the display may be controlled to communicate and/or display the visual driver posture warning. Further, with the plurality of preset conditions, the processor 126 of the instrument cluster apparatus 120 may be capable of checking the plurality of pressure readings against the range of suboptimal sitting postures for warning or alerting the driver.

According to various embodiments, the processor 126 of the instrument cluster apparatus 120 may monitor the plurality of pressure readings at regular monitoring intervals. Accordingly, the processor 126 of the instrument cluster apparatus 120 may receive the plurality of pressure readings at a fixed regular time interval for processing or may process the plurality of pressure readings received at the fixed regular time interval. For example, the processor 126 of the instrument cluster apparatus 120 may monitor the plurality of pressure readings at 10 seconds interval, 20 seconds interval, 30 seconds interval, 40 seconds interval, 50 seconds interval, 1 minute interval, 1.5 minute interval, 2 minute interval, etc.

According to various embodiments, the processor 126 of the instrument cluster apparatus 120 may be configured to control the at least one portion 123 of the display 122 to display a driver posture warning 130 based on the plurality of pressure readings meeting one of a plurality of preset conditions over a corresponding predetermined time period. According to various embodiments, the predetermined time period may be longer than each monitoring interval of the plurality of pressure readings. Accordingly, within each predetermined time period, the processor 126 of the instrument cluster apparatus 120 may have multiple occurrences of monitoring the plurality of pressure readings depending on a number of counts when said predetermined time period is divided by the monitoring interval. Each count may translate to one single occurrence of monitoring the plurality of pressure readings. Hence, during each occurrence of monitoring the plurality of pressure readings, the processor 126 of the instrument cluster apparatus 120 may check, compare, analyze or evaluate one corresponding set of the plurality of pressure readings against the plurality of preset conditions. Thus, within each predetermined time period, the processor 126 of the instrument cluster apparatus 120 may check, compare, analyze or evaluate multiple sets of the plurality of pressure readings against the plurality of preset conditions. In the various embodiments, when the multiple sets of the plurality of pressure readings processed over the predetermined time period consistently meet the one of a plurality of preset conditions (i.e. meeting the same preset condition throughout the predetermined time period), the processor 126 of the instrument cluster apparatus 120 may then control the at least one portion 123 of the display 122 to display the driver posture warning 130. In this manner, the instrument cluster apparatus 120 may avoid communicating and/or displaying the driver posture warning 130 due to false reading, as well as avoid communicating and/or displaying the driver posture warning 130 when the driver is momentarily in the suboptimal sitting posture.

According to various embodiments, the at least one portion 123 of the display 122 of the instrument cluster apparatus 120 may be originally displaying the one or more vehicle parameters. Therefore, when the processor 126 of the instrument cluster apparatus 120 determines that the plurality of pressure readings meets one of the plurality of preset conditions, for example over the corresponding predetermined time period, the processor 126 of the instrument cluster apparatus 120 may control the at least one portion 123 of the display 122 to switch from displaying the one or more vehicle parameters or information to displaying the driver posture warning 130. Accordingly, the processor 126 of the instrument cluster apparatus 120 may change or replace a graphic or textual content of the at least one portion 123 of the display 122 of the instrument cluster apparatus 120 originally associated with the one or more vehicle parameters to a graphic or textural content associated with the driver posture warning 130. For example, referring to FIG. 1, the at least one portion 123 of the display 122 of the instrument cluster apparatus 120 may originally be displaying a tachometer face and may be switched to display the driver posture warning 130 when the plurality of pressure readings meets the one of the plurality of preset conditions, for example over the corresponding predetermined time period.

Figure 3A:
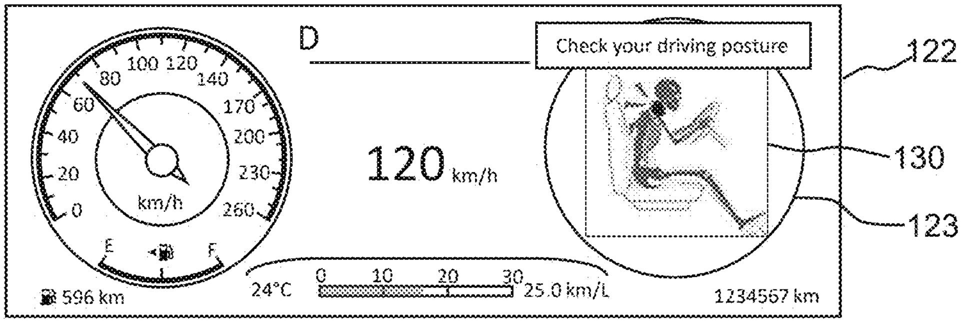
FIG. 3A shows an example of a display of an instrument cluster apparatus of the driver posture warning arrangement of FIG. 1 when a plurality of pressure readings meets a first preset condition according to various embodiments.
Figure 4A:
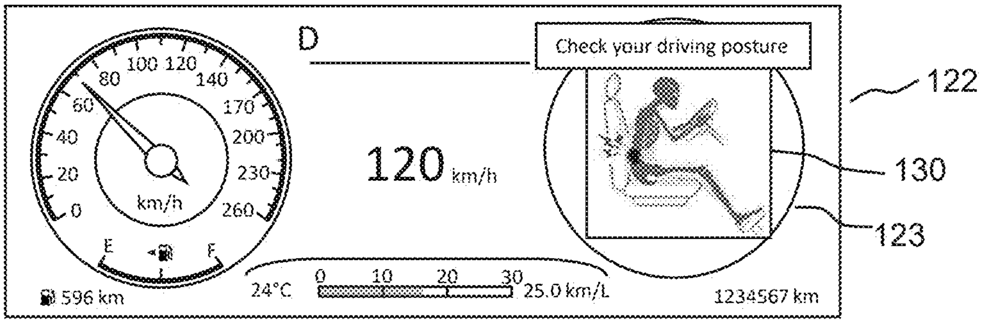
FIG. 4A shows an example of the display of the instrument cluster apparatus of the driver posture warning arrangement of FIG. 1 when the plurality of readings meets a second preset condition according to various embodiments.
Figure 5:
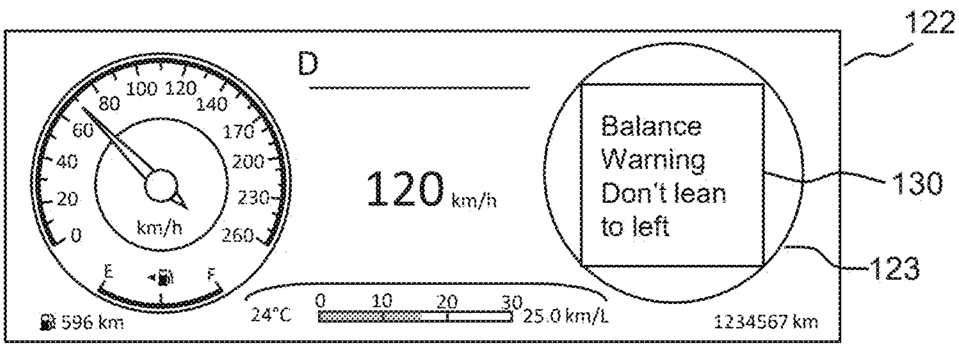
FIG. 5 shows an example of the display of the instrument cluster apparatus of the driver posture warning arrangement of FIG. 1 when the plurality of readings meets a third preset condition according to various embodiments.

According to various embodiments, the driver posture warning 130 may be selected from a library of warning contents respectively associated with the plurality of preset conditions (for example, see FIG. 3A, FIG. 4A and FIG. 5). Hence, each warning content may be associated with a single corresponding preset condition representative of a single corresponding suboptimal sitting posture. Accordingly, depending on the one of the plurality of preset conditions met by the plurality of pressure readings, the processor 126 of the instrument cluster apparatus 120 may select a corresponding warning content from the library of warning contents for displaying by the display 122 as the driver posture warning 130. Thus, the display 122 may display different warning contents serving as the visual driver posture warning 130 for different preset conditions respectively associated with the different suboptimal sitting postures. The different warning contents may provide information to alert the driver which suboptimal sitting posture the driver is in so that the driver may know what needs to be corrected. According to various embodiments, each warning content may be in a graphic form or a textual form or a combination of both.

According to various embodiments, the instrument cluster apparatus 120 may include a memory 128. The processor 126 of the instrument cluster apparatus 120 may be operatively coupled to the memory 128. The memory 128 may store the library of warning contents and/or the plurality of preset conditions and/or instructions/software/codes/program. Accordingly, the processor 126 of the instrument cluster apparatus 120 may carry out the various processes using the memory 128. According to various embodiments, the memory 128 of the instrument cluster apparatus 120 may be used in the processing carried out by the processor 126 of the instrument cluster apparatus 120. The memory 128 used in the various embodiments may be a non-volatile memory, for example a PROM (Programmable Read Only Memory), an EPROM (Erasable PROM), EEPROM (Electrically Erasable PROM), ROM (Read-Only Memory) or a flash memory, e.g., a floating gate memory, a charge trapping memory, an MRAM (Magnetoresistive Random Access Memory) or a PCRAM (Phase Change Random Access Memory).

According to various embodiments, the processor 126 of the instrument cluster apparatus 120 may be configured to control the at least one portion 123 of the display 122 to cease displaying the driver posture warning 130 after a predetermined duration of displaying the driver posture warning 130. Accordingly, the driver posture warning 130 may be displayed for the predetermined duration to alert the driver and be removed after the predetermined duration.

According to various embodiments, when the at least one portion 123 of the display 122 of the instrument cluster apparatus 120 was originally displaying the one or more vehicle parameters, the processor 126 of the instrument cluster apparatus 120 may be configured to control the at least one portion 123 of the display 122 to switch from displaying the driver posture warning 130 back to displaying the one or more vehicle parameters after displaying the driver posture warning 130 for the predetermined duration. Accordingly, the driver posture warning 130 may be displayed for the predetermined duration, after which the processor 126 of the instrument cluster apparatus 120 may change or replace the graphic or textual content of the at least one portion 123 of the display 122 of the instrument cluster apparatus 120 associated with the driver posture warning 130 to revert back to the graphic or textural content associated with the one or more vehicle parameters. For example, referring to FIG. 1, the at least one portion 123 of the display 122 of the instrument cluster apparatus 120 may display the driver posture warning 130 for the predetermined duration and then switch back to displaying the tachometer face.

According to various embodiments, the processor 126 of the instrument cluster apparatus 120 may be configured to control the at least one portion 123 of the display 122 cease displaying the driver posture warning 130 based on the plurality of pressure readings failing to meet any of the plurality of preset conditions. After the driver is being alerted by the driver posture warning 130 that his/her sitting posture is suboptimal, the driver may correct his/her sitting posture. As a result, the sitting posture of the driver may no longer be suboptimal. Hence, the plurality of pressure readings received by the processor 126 of the instrument cluster apparatus 120 through the pressure sensing input interface 124 of the instrument cluster apparatus 120 may no longer meet any of the plurality of preset conditions. Thus, the processor 126 of the instrument cluster apparatus 120 may be configured to cease displaying the driver posture warning 130 when the plurality of pressure readings fails to meet any of the plurality of preset conditions. According to various embodiments, the at least one portion 123 of the display 122 may be controlled to cease displaying the driver posture warning 130 based on the plurality of pressure readings failing to meet any of the plurality of preset conditions over the corresponding predetermined time period in order to avoid false reading and/or the driver momentarily correcting the sitting posture.

According to various embodiments, when the at least one portion 123 of the display 122 of the instrument cluster apparatus 120 was originally displaying the one or more vehicle parameters, the processor 126 of the instrument cluster apparatus 120 may be configured to control the at least one portion 123 of the display 122 to switch from displaying the driver posture warning 130 back to displaying the one or more vehicle parameters based on the plurality of pressure readings failing to meet any of the plurality of preset conditions. Accordingly, after the driver correct his/her sitting posture such that it may no longer be suboptimal, the plurality of pressure readings received by the processor 126 of the instrument cluster apparatus 120 through the pressure sensing input interface 124 of the instrument cluster apparatus 120 may no longer meet any of the plurality of preset conditions. Thus, the processor 126 of the instrument cluster apparatus 120 may be configured to cease displaying the driver posture warning 130 and revert back to displaying the one or more vehicle parameters. Hence, the processor 126 of the instrument cluster apparatus 120 may change or replace the graphic or textual content of the at least one portion 123 of the display 122 of the instrument cluster apparatus 120 associated with the driver posture warning 130 back to the graphic or textural content associated with the one or more vehicle parameters when the plurality of pressure readings fails to meet any of the plurality of preset conditions. According to various embodiments, the at least one portion 123 of the display 122 may be controlled to switch from displaying the driver posture warning 130 back to displaying the one or more vehicle parameters based on the plurality of pressure readings failing to meet any of the plurality of preset conditions over the corresponding predetermined time period in order to avoid false reading and/or the driver momentarily correcting the sitting posture.

Figure 2:
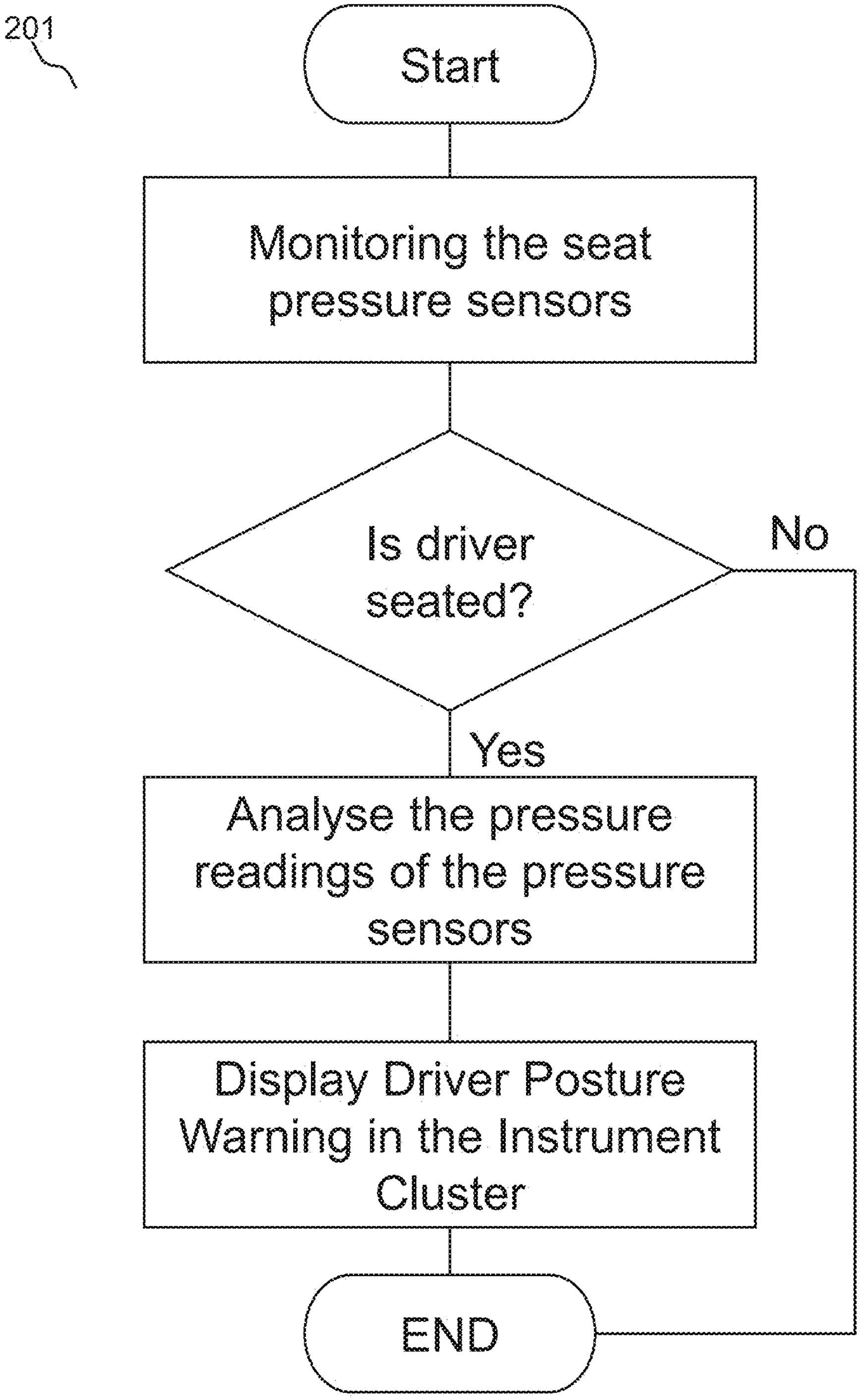
FIG. 2 shows a flowchart of a cycle of operation of the driver posture warning arrangement of FIG. 1 according to various embodiments.

FIG. 2 shows a flowchart 201 of a cycle of operation of the driver posture warning arrangement 100 according to various embodiments. According to various embodiments, the processor 126 of the instrument cluster apparatus 120 may monitor the plurality of pressure sensors 118*a* to 118*i* of the driver seat 110 and receive the plurality of pressure readings through the pressure sensing input interface 124 of the instrument cluster apparatus 120. According to various embodiments, with the plurality of pressure readings, the processor 126 of the instrument cluster apparatus 120 may determine whether the driver seat 110 is occupied (i.e. whether the driver is seated). According to various embodiments, the processor 126 of the instrument cluster apparatus 120 may determine that the driver seat 110 is occupied based on at least two of the plurality of pressure readings sensed by at least two corresponding pressure sensors of the plurality of pressure sensors 118*a* to 118*i* have non-null values (or non-zero values). Accordingly, when the at least two pressure sensors of the plurality of pressure sensors 118*a* to 118*i* measure valid pressure readings which are non-null values (or non-zero values), the processor 126 of the instrument cluster apparatus 120 may determine that the driver seat 110 is occupied. According to various embodiments, the processor 126 of the instrument cluster apparatus 120 may determine that the driver seat 110 is occupied based on at least two of the plurality of pressure readings sensed by at least two corresponding pressure sensors of the plurality of pressure sensors 118*a* to 118*i* are above a predetermined threshold. Accordingly, when the pressure readings of the at least two pressure sensors of the plurality of pressure sensors 118*a* to 118*i* are above the predetermined threshold, the processor 126 of the instrument cluster apparatus 120 may determine that the driver seat 110 is occupied. Accordingly to various embodiments, the at least two pressure sensors of the plurality of pressure sensors 118*a* to 118*i* may be the pressure sensors at the forward region 112*b* of the seat 112 of the driver seat 110. For example, the at least two pressure sensors of the plurality of pressure sensors 118*a* to 118*i* may be the eighth pressure sensor 118*h* and the ninth pressure sensor 118*i* of the driver seat 110 as shown in FIG. 1.

According to various embodiments, after the processor 126 of the instrument cluster apparatus 120 determines that the driver seat 110 is occupied, the processor 126 of the instrument cluster apparatus 120 may then determine whether the plurality of pressure readings meets any one of the plurality of preset conditions, for example over the corresponding predetermined time period. If the processor 126 of the instrument cluster apparatus 120 determines that the plurality of pressure readings meets one of the plurality of preset conditions, for example over the corresponding predetermined time period, the processor 126 of the instrument cluster apparatus 120 may then control the at least one portion 123 of the display 122 to display the driver posture warning 130 or control at least one portion 123 of the display 122 to switch from displaying the one or more vehicle parameters or information to displaying the driver posture warning 130. After the driver posture warning 130 is displayed, the cycle of operation ends and the next cycle of operation starts again with the processor 126 of the instrument cluster apparatus 120 monitoring the plurality of pressure sensors 118*a* to 118*i* of the driver seat 110 and receiving the next set of the plurality of pressure readings.

According to various embodiments, if the processor 126 of the instrument cluster apparatus 120 determine that the driver seat 110 is unoccupied, the cycle of operation ends and the next cycle of operation starts again with the processor 126 of the instrument cluster apparatus 120 monitoring the plurality of pressure sensors 118*a* to 118*i* of the driver seat 110 and receiving the next set of the plurality of pressure readings. According to various embodiments, if processor 126 of the instrument cluster apparatus 120 determine that the plurality of pressure readings fails to meet any one of the plurality of preset conditions, for example over the corresponding predetermined time period, the cycle of operation also ends and the next cycle of operation starts again with the processor 126 of the instrument cluster apparatus 120 monitoring the plurality of pressure sensors 118*a* to 118*i* of the driver seat 110 and receiving the next set of the plurality of pressure readings.

Figure 3B:
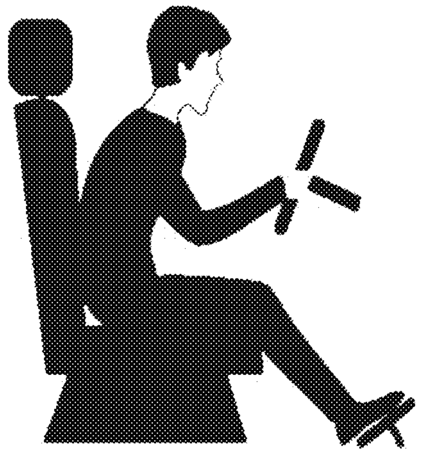
FIG. 3B shows a first suboptimal sitting posture of a driver associated with the first preset condition according to various embodiments.
Figure 3C:
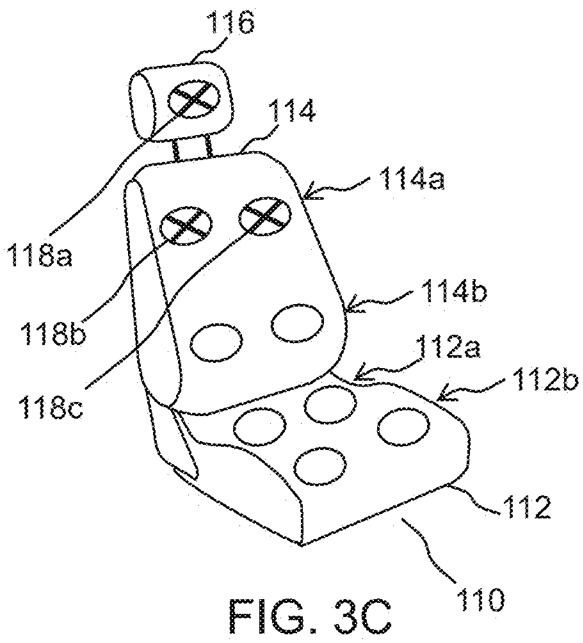
FIG. 3C shows a state of a plurality of pressure sensors for the first preset condition according to various embodiments.
Figure 4B:
FIG. 4B shows a second suboptimal sitting posture of the driver associated with the second preset condition according to various embodiments.
Figure 4C:
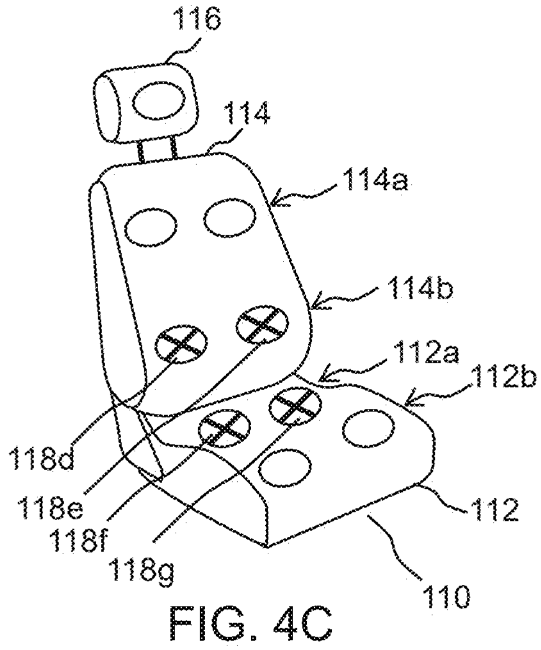
FIG. 4C shows a state of the plurality of pressure sensors for the second preset condition according to various embodiments.

FIG. 3A shows an example of the display 122 of the instrument cluster apparatus 120 when the plurality of readings meets a first preset condition according to various embodiments. FIG. 3B shows a first suboptimal sitting posture of the driver associated with the first preset condition according to various embodiments. FIG. 3C shows a state of the plurality of pressure sensors 118*a* to 118*i* for the first preset condition according to various embodiments. FIG. 4A shows an example of the display 122 of the instrument cluster apparatus 120 when the plurality of readings meets a second preset condition according to various embodiments. FIG. 4B shows a second suboptimal sitting posture of the driver associated with the second preset condition according to various embodiments. FIG. 4C shows a state of the plurality of pressure sensors 118*a* to 118*i* for the second preset condition according to various embodiments.

Referring to FIG. 3C and FIG. 4C, according to various embodiments, the plurality of preset conditions may include a predetermined subset of the pressure readings giving null values (or zero values), for example throughout the corresponding predetermined time period. According to various embodiments, the plurality of pressure sensors 118*a* to 118*i* may be distributed in the driver seat 110 in a manner such that the driver sitting in one or more suboptimal sitting postures may not apply any pressure to one or more pressure sensors among the plurality of pressure sensors 118*a* to 118*i*. Accordingly, the pressure readings from the one or more pressure sensors may give null values (or zero values). Hence, by establishing a preset condition to include a predetermined subset of the pressure readings giving null values, whereby the predetermined subset of the pressure readings correspond to a corresponding subset of the pressure sensors which may not receive any pressure when the driver is sitting in the corresponding suboptimal sitting posture, the preset condition may allow the processor 126 of the instrument cluster apparatus 120 to determine whether the driver is sitting in that suboptimal sitting posture.

Referring to FIG. 3B and FIG. 3C, when the driver is sitting in a hunching posture, which is one of the suboptimal sitting postures, the head and the shoulders of the driver may not be touching or in contact with the headrest 116 and the upper region 114*a* of the backrest 114. Accordingly, the first preset condition may be established with a first subset of the plurality of pressure readings associated with a first subset of the plurality of pressure sensors 118*a* to 118*i* distributed in the headrest 116 and the upper region 114*a* of the backrest 114 giving null values (or zero values), for example throughout the corresponding predetermined time period. For illustration only, in FIG. 3C, the first subset of the plurality of pressure sensors 118*a* to 118*i* may include the first pressure sensor 118*a* disposed in the headrest 116 as well as the second pressure sensor 118*b* and the third pressure sensor 118*c* disposed side by side in the upper region 114*a* of the backrest 114. Referring to FIG. 3A, when the processor 126 of the instrument cluster apparatus 120 determine that the plurality of pressure readings meet the first preset conditions, the processor 126 of the instrument cluster apparatus 120 may select a warning content highlighting a neck region of a graphic of a driver sitting in the driver seat as the driver posture warning 130.

Referring to FIG. 4B and FIG. 4C, when the driver is sitting in a slouching posture, which is also one of the suboptimal sitting postures, the lower back and the bottom of the driver may not be touching or in contact with the lower region 114*b* of the backrest 114 and the aft region 112*a* of the seat 112. Accordingly, the second preset condition may be established with a second subset of the plurality of pressure readings associated with a second subset of the plurality of pressure sensors 118*a* to 118*i* distributed in the lower region 114*b* of the backrest 114 and the aft region 112*a* of the seat 112 giving null values (or zero values), for example throughout the corresponding predetermined time period. For illustration only, in FIG. 4C, the second subset of the plurality of pressure sensors 118*a* to 118*i* may include the fourth pressure sensor 118*d* and the fifth pressure sensor 118*e* disposed side by side in the lower region 114*b* of the backrest 114 as well as the sixth pressure sensor 118*f* and the seventh pressure sensor 118*g* disposed side by side in the aft region 112*a* of the seat 112. Referring to FIG. 4A, when the processor 126 of the instrument cluster apparatus 120 determine that the plurality of pressure readings meet the second preset conditions, the processor 126 of the instrument cluster apparatus 120 may select a warning content highlighting a lower back region of a graphic of a driver sitting in the driver seat as the driver posture warning 130.

FIG. 5 shows an example of the display 122 of the instrument cluster apparatus 120 when the plurality of readings meets a third preset condition according to various embodiments.

According to various embodiments, the plurality of preset conditions may include at least one or more predetermined pairs of pressure readings having a difference greater than a corresponding predetermined threshold value, for example throughout the corresponding predetermined time period. The suboptimal postures may also include the driver leaning to one lateral side of the driver seat 110. Accordingly, a preset condition may be associated to the suboptimal posture of the driver leaning to one lateral side of the driver seat 110. When the driver is leaning to one lateral side of the driver seat 110, the pressure applied to a pair of pressure sensors at a same level by the driver may be unbalance. Hence, by establishing a preset condition to include at least one or more predetermined pairs of pressure readings having a difference greater than a corresponding predetermined threshold value (i.e. due to the unbalance pressure), whereby the at least one or more predetermined pairs of pressure readings correspond to a corresponding at least one or more predetermined pairs of the pressure sensors which may receive unequal pressure when the driver is leaning to one lateral side of the driver seat 110, the preset condition may allow the processor 126 of the instrument cluster apparatus 120 to determine whether the driver is sitting in such suboptimal sitting posture. The predetermined threshold value may be based on a minimum difference between the unequal pair of pressure readings to consider the driver to be leaning to one lateral side of the driver seat 110.

According to various embodiments, the third preset condition may be established with at least one or more predetermined pairs of pressure readings having a difference greater than a corresponding predetermined threshold value, for example throughout the corresponding predetermined time period. According to various embodiments, the at least one or more predetermined pairs of pressure readings may include a pair of pressure readings including a first reading associated with a left pressure sensor disposed on a left side of the seat 112 or the backrest 114 and a second reading associated with a right pressure sensor disposed on a right side of the seat 112 or the backrest 114, wherein the left pressure sensor and the right pressure sensor may be directly opposite each other across a centreline of the seat 112 or the backrest 114. For illustration only, referring to FIG. 1, the left pressure sensor may be the second pressure sensor 118*b* in the upper region 114*a* of the backrest 114 and the right pressure sensor may be the third pressure sensor 118*c* in the upper region 114*a* of the backrest 114, and/or the left pressure sensor may be the fourth pressure sensor 118*d* in the lower region 114*b* of the backrest 114 and the right pressure sensor may be the fifth pressure sensor 118*e* in the lower region 114*b* of the backrest 114, and/or the left pressure sensor may be the sixth pressure sensor 118*f* in the aft region 112*a* of the seat 112 and the right pressure sensor may be the seventh pressure sensor 118*g* in the aft region 112*a* of the seat 112, and/or the left pressure sensor may be the eighth pressure sensor 118*h* in the forward region 112*b* of the seat 112 and the right pressure sensor may be the ninth pressure sensor 118*i* in the forward region 112*b* of the seat 112. Referring to FIG. 5, when the processor 126 of the instrument cluster apparatus 120 determine that the plurality of pressure readings meet the third preset conditions, the processor 126 of the instrument cluster apparatus 120 may select a warning content in textual format informing the driver not to lean for serving as the driver posture warning 130.

Various embodiments have provided an instrument cluster apparatus and a driver posture warning arrangement including the instrument cluster apparatus which may keep the driver from drifting into the suboptimal posture during driving.

While embodiments of the invention have been particularly shown, and described with reference to specific embodiments, it should be understood by those skilled in the art that various changes in form and detail may be made therein without departing from the scope of the invention as defined by the appended claims. The scope of the disclosure is thus indicated by the appended claims and all changes which come within the meaning of the claims are therefore intended to be embraced.

The invention claimed is:

1. An instrument cluster apparatus for a vehicle comprising:

a display;

a pressure sensing input interface connectable to a plurality of pressure sensors distributed in a seat, a backrest, and a headrest of a driver seat to receive a plurality of pressure readings sensed by the plurality of pressure sensors; and a processor connected to the display and the pressure sensing input interface, the processor being configured to control at least one portion of the display to switch from displaying one or more vehicle parameters to displaying a driver posture warning based on the plurality of pressure readings meeting one of a plurality of preset conditions over a corresponding predetermined time period.

2. The instrument cluster apparatus as claimed in claim 1, wherein the plurality of preset conditions include a predetermined subset of the pressure readings giving null values throughout the corresponding predetermined time period.

3. The instrument cluster apparatus as claimed in claim 2, wherein the predetermined subset of the plurality of pressure readings include a first subset of the plurality of pressure readings associated with a first subset of the plurality of pressure sensors distributed in the headrest and a upper region of the backrest, or a second subset of the plurality of pressure readings associated with a second subset of the plurality of pressure sensors distributed in a lower region of the backrest and a aft region of the seat.

4. The instrument cluster apparatus as claimed in claim 1, wherein the plurality of preset conditions include at least one or more predetermined pairs of pressure readings having a difference greater than a corresponding predetermined threshold value throughout the corresponding predetermined time period.

5. The instrument cluster apparatus as claimed in claim 4, wherein the at least one or more predetermined pairs of pressure readings include a first reading associated with a left pressure sensor disposed on a left side of the seat or the backrest and a second reading associated with a right pressure sensor disposed on a right side of the seat or the backrest, wherein the left pressure sensor and the right pressure sensor are directly opposite each other across a centreline of the seat or the backrest.

6. The instrument cluster apparatus as claimed in claim 1, wherein the pressure sensing input interface comprises a plurality of pressure sensing input terminals respectively connectable to the plurality of pressure sensors to respectively receive the plurality of pressure readings of the plurality of pressure sensors, and wherein the processor is configured to control the at least one portion of the display to switch from displaying the one or more vehicle parameters to displaying the driver posture warning based on the plurality of pressure readings respectively received through the plurality of pressure sensing input terminals meeting the one of the plurality of preset conditions over the corresponding predetermined time period.

7. The instrument cluster apparatus as claimed in claim 1, wherein the processor is configured to control the at least one portion of the display to switch from displaying the one or more vehicle parameters to displaying the driver posture warning based on the plurality of pressure readings meeting the one of the plurality of preset conditions over the corresponding predetermined time period when the processor determines that the driver seat is occupied based on the plurality of pressure readings.

8. The instrument cluster apparatus as claimed in claim 7, wherein the processor determines that the driver seat is occupied based on at least two of the plurality of pressure readings sensed by at least two corresponding pressure sensors of the plurality of pressure sensors have non-null values.

9. The instrument cluster apparatus as claimed in claim 1, wherein the processor is configured to monitor the plurality of pressure readings at regular monitoring intervals.

10. The instrument cluster apparatus as claimed in claim 1, wherein the processor is configured to control the at least one portion of the display to switch from displaying the driver posture warning to displaying the one or more vehicle parameters after displaying the driver posture warning for a predetermined duration.

11. The instrument cluster apparatus as claimed in claim 1, wherein the processor is configured to control the at least one portion of the display to switch from displaying the driver posture warning to displaying the one or more vehicle parameters based on the plurality of pressure readings failing to meet any of the plurality of preset conditions over the corresponding predetermined time period.

12. The instrument cluster apparatus as claimed in claim 1, wherein the driver posture warning is selected from a library of warning contents respectively associated with the plurality of preset conditions, wherein a corresponding one of the plurality of warning contents associated with the one of the plurality of preset conditions met is selected to be displayed as the driver posture warning when the one of the plurality of preset conditions is met.

13. The instrument cluster apparatus as claimed in claim 1, wherein the one or more vehicle parameters comprises vehicle speed, distance travelled, rotation speed, oil pressure, fuel level, engine temperature, or battery voltage.

14. A driver posture warning arrangement, comprising:

an instrument cluster apparatus, comprising:

a display;

a pressure sensing input interface connectable to a plurality of pressure sensors distributed in a seat, a backrest, and a headrest of a driver seat to receive a plurality of pressure readings sensed by the plurality of pressure sensors; and a processor connected to the display and the pressure sensing input interface, the processor being configured to control at least one portion of the display to switch from displaying one or more vehicle parameters to displaying a driver posture warning based on the plurality of pressure readings meeting one of a plurality of preset conditions over a corresponding predetermined time period, wherein the driver seat having the plurality of pressure sensors distributed in the seat, the backrest, and the headrest, wherein the plurality of pressure sensors is coupled to the pressure sensing input interface of the instrument cluster apparatus.

15. The driver posture warning arrangement according to claim 14, wherein each of the plurality of pressure sensors comprises a film-type pressure sensor.

* * * * *